United States Patent [19]
Bass et al.

[11] 3,808,781
[45] May 7, 1974

[54] HARVESTING PLATFORM SUSPENSION SYSTEM

[75] Inventors: Merlyn Duane Bass; Sidney Joseph Boushek, Jr., both of Ottumwa, Iowa

[73] Assignee: Deere & Company, Moline, Ill.

[22] Filed: Dec. 8, 1972

[21] Appl. No.: 313,577

[52] U.S. Cl. ................................................ 56/15.9
[51] Int. Cl. ............................................ A01d 35/14
[58] Field of Search ......... 56/11.9, 12.7, 14.3, 14.4, 56/14.5, 14.6, 14.9, 15.8, 15.9, 15.2, 220, 222, 208, 210

[56] References Cited
UNITED STATES PATENTS
3,293,835   12/1966   Gehman et al. ..................... 56/15.9

*Primary Examiner*—Antonio F. Guida

[57] ABSTRACT

A self-propelled windrower has a traction unit and a forward transversely elongated harvesting platform, which cuts a standing crop, converges it, and delivers it rearwardly through a central crop discharge opening. The platform is mounted for vertical adjustment on the traction unit by a pair of four-bar linkages at opposite sides of the traction unit, each linkage including a fore-and-aft upper link and a fore-and-aft lower link, which is formed by a hydraulic cylinder. A pair of downwardly and forwardly inclined tension springs extend between the traction unit and the platform and counterbalance most of the weight of the platform when the machine is operating with the platform riding on the ground. The platform is raised to transport position by extending the cylinders, which affects the geometry of the linkages so that the springs raise the platform, and after the platform raises a predetermined amount, the upper links engage stops, so that the linkages function as a hinge-type suspension with the platform raising about the pivot connections between the upper links and the platform.

8 Claims, 3 Drawing Figures

HARVESTING PLATFORM SUSPENSION SYSTEM

BACKGROUND OF THE INVENTION

This invention relates to an improved system for vertically adjustably suspending a harvesting platform or header from the main frame of an agricultural machine, such as windrower.

A windrower, whether of the self-propelled or pull-type, conventionally includes a forward transversely elongated harvesting platform or header, which includes a cutting mechanism extending the width of the header for severing the crop from the field. The crop is converged and discharged onto the ground in a windrow, and in some cases, particularly when the machine is being used for a forage crop such as hay, the crop is conditioned before it is deposited on the ground in the windrow. The harvesting platform is conventionally mounted on the main frame or traction unit for vertical adjustment between a lowered operating position and a raised transport position by some type of suspension mechanism.

One type of known suspension mechanism is a four-bar or parallel-linkage system, which generally utilizes a pair of laterally spaced parallel linkages formed by a pair of generally fore-and-aft upper links and fore-and-aft lower links extending between the platform and the main frame. Also included in such systems are springs for counterbalancing the weight of the platform and hydraulic cylinders for raising the platforms. This type of system offers the advantage of providing good floating characteristics for the platform and allowing a limited amount of tilting of the platform about a fore-and-aft axis, so that the platform will follow the contour of the ground. A disadvantage of this type of system resides in the fact that the platform is less stable in the transport position and a relatively large amount of cylinder travel is required to provide the desired amount of platform height in the transport position.

A second type of suspension mechanism is the hinge-type suspension, wherein the platform is hinged to the main frame about an upper transverse pivot and it is raised by rocking the platform about the pivot by means of a hydraulic cylinder. Springs are also provided between the main frame and the platform to partly counterbalance the weight of the platform. In the hinge-type system, the platform is not free to tilt about a fore-and-aft axis, nor are the float characteristics of the platform as good as in the four-bar linkage system, although the platform is normally more stable in the transport position and raises more quickly for a given amount of cylinder travel.

SUMMARY OF THE INVENTION

According to the present invention, an improved suspension system is provided for vertically adjustably mounting a harvesting platform on the main frame of a harvesting machine. More particularly, the improved suspension system functions as a four-bar or parallel-linkage suspension system with its attendant advantages in the lowered operating position of the platform, while functioning as a hinge-type system after the platform is raised a predetermined amount, to provide a more stable platform in the transport position and a more rapid raising to said position.

An important feature of the invention resides in the use of a hydraulic cylinder as the lower link of the system, eliminating the conventional lower link of a parallel linkage system.

Another feature of the invention resides in the provision of stop means for engaging the upper links so that the platform hinges about the forward end of the upper links after a predetermined amount of raising.

Also according to the invention, lower stops are provided for limiting the downward movement of the upper links so that the linkage does not go over-center and the maximum downfloat of the platform is controlled. The lower stops also prevent over-extension of the counterbalance springs.

Another feature of the invention resides in the geometry of the suspensiom mechanism, whereby the springs cause the platform to raise as the cylinders extend.

DESCRIPTION OF THE PREFERRED EMBODIMENT

Figure 1:
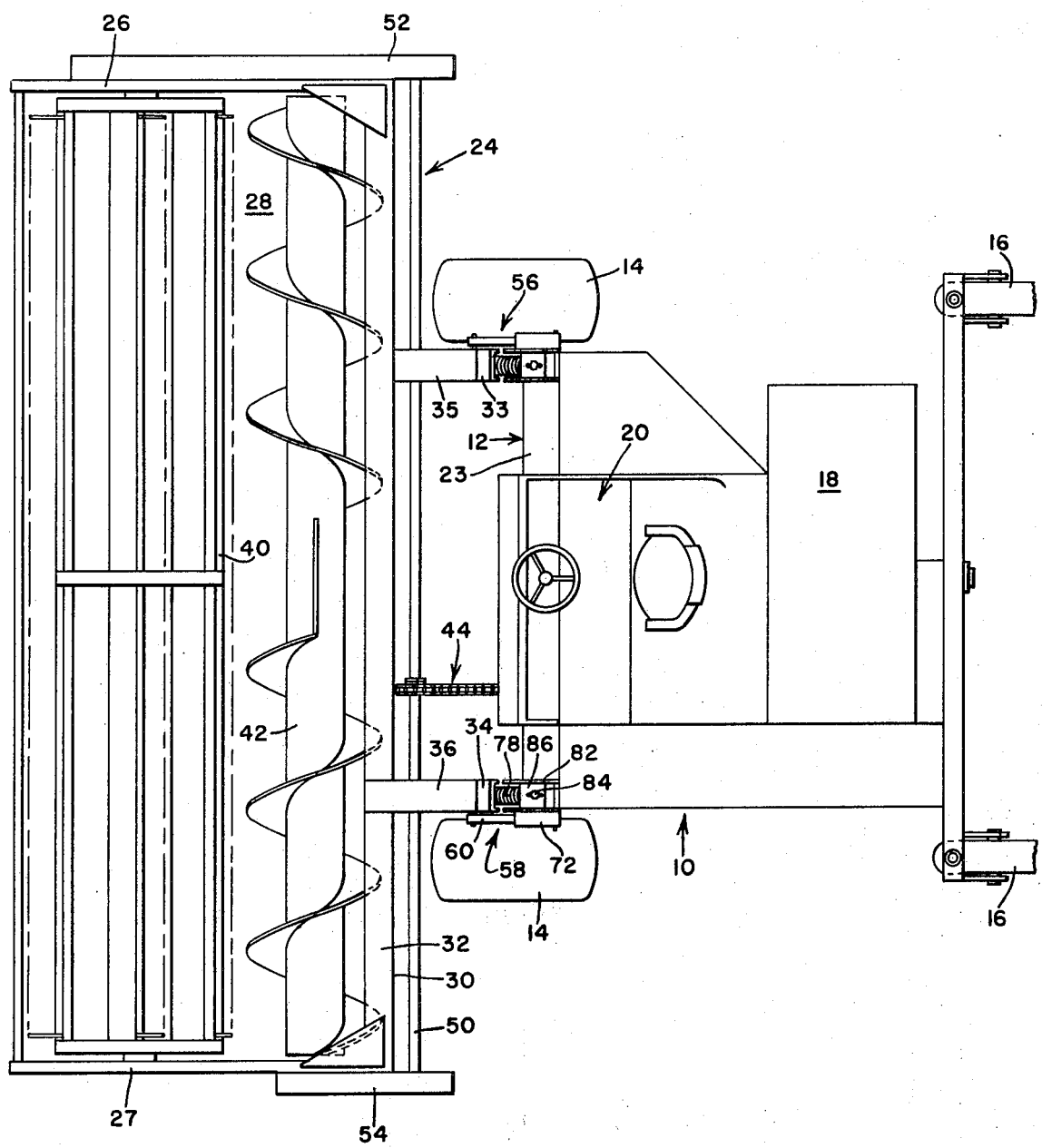
FIG. 1 is a plan view of a self-propelled windrower with an auger-type platform suspended from the windrower traction unit by means of the improved suspension mechanism.

The invention is embodied in a self-propelled windrower having a traction unit 10, which includes a main frame 12 mounted on a pair of forward drive wheels 14 and a pair of rear castor wheels 16. The traction unit includes a transversely oriented rear engine 18 and a forward, centrally located operator's station 20, the above representing more of this conventional windrower traction unit construction. The main frame 12 includes a pair of depending wheel support structures 22 on opposite sides of a transverse frame member 23 at the forward end of the main frame 12, the drive wheels 14 being mounted on the respective wheel support structures and driven by drive mechanism disposed therein.

As is conventional, the windrower has a forward, transversely elongated harvesting platform or header 24, which includes a pair of upright side panels 26 and 27, and a generally horizontal floor 28 which extends between the side panels 26 and 27 and curves upwardly to merge with a generally upright rear wall 30. A transverse beam 32 spans the width of the platform at the upper edge of the rear wall 30, and right and left channel-like frame members 33 and 34, respectively, have their lower forward ends connected to the floor and extended upwardly and rearwardly behind the rear wall 30. The frame members 33 and 34 have an inverted U-shaped cross section and are respectively disposed immediately in front of the opposite wheel support structures 22. The upper ends of the frame members 33 and 34 are respectively connected to the transverse beam 32 by right and left connecting members 35 and 36, which also have an inverted U-shaped cross section.

As is well known, the platform includes a transverse cutterbar 38 which extends between the opposite side panels 26 and 27 along the leading edge of the floor 28, and a transverse reel 40 which is journaled in and extends between the side panels 26 and 27 above and slightly forwardly of the cutterbar. A transverse auger 42 also extends between the opposite side panels immediately to the rear of the reel and includes oppositely wound flights, which converge the crop to the center of the platform where it is discharged rearwardly. As is apparent, the reel 40 feeds the crop to the cutterbar 38, which severs the standing crop as the machine advances, and then feeds the severed crop to the auger 42, which converges the crop and discharges it rearwardly through a central opening (not shown) in the rear wall 30. Generally, a crop conditioner unit (not shown) is mounted on the rear wall of the platform in association with the discharge opening to condition the crop before it is discharged onto the ground in a windrow underneath the traction unit.

The platform components are driven by a chain-type drive 44, which includes a drive sprocket 46 on the main frame and a driven sprocket 48 mounted on a transverse shaft 50, which is journaled on and spans the width of the platform immediately behind the platform beam 32. The cutterbar, the reel and the auger are driven by conventional drives from the opposite ends of the shaft 50, the drives being at least partly covered by shields 52 and 54 at the opposite ends of the platform.

The platform 24 is carried by the traction unit 10 for vertical adjustment relative thereto by a pair of transversely spaced suspension mechanisms indicated generally by the numerals 56 and 58. The suspension mechanisms 56 and 58 are disposed immediately inside the opposite drive wheels 14 and are identical, so only the left suspension mechanism 58 will be described in detail.

The left suspension mechanism 58 includes a generally fore-and-aft upper link 60 having its rearward end connected to the main frame 12 by a transverse pivot 62 and its forward end connected to the platform frame member 34 adjacent the upper end of the member by means of a transverse pivot 64. A generally fore-and-aft one-way hydraulic cylinder 66 is disposed below the upper link 60 and has its rearward end connected to the lower front portion of the wheel support structure 22 by a transverse pivot 68 and its forward or piston end connected to the member 34 by means of a transverse pivot 70. Thus, the cylinder 66 functions as the lower link in a four-bar or parallelogram-type linkage which permits the vertical adjustment of the platform relative to the traction unit.

The rear pivot 62 of the upper link 60 is mounted in the rearward end of a forwardly open and diverging horn-shaped housing 72 having an upwardly and forwardly inclined top wall 74 and a forwardly and slightly downwardly inclined bottom wall 76. As is apparent, the top wall 74 and the bottom wall 76 function as stops, which respectively limit the upward movement and the downward movement of the upper link 60.

A helical tension spring 78 extends between the platform 24 and the main frame 12 and is inclined forwardly and downwardly from the main frame, the lower forward end of the spring being connected to the platform frame member 34 rearwardly of the front pivot 70 and adjacent the curvature between the platform floor and rear wall by means of a mounting bracket 80. The upper, rearward end of the spring 78 is connected to a bracket 82 on the main frame member 23 by means of an adjusting bolt 84. The bracket 82 is disposed adjacent to the pivot housing 72 and includes an arcuate transverse portion 86 having a hole through which the adjusting bolt 84 extends, the head of the adjusting bolt riding on the arcuate surface to permit rocking of the spring about its upper end as the platform raises and lowers.

Figure 2:
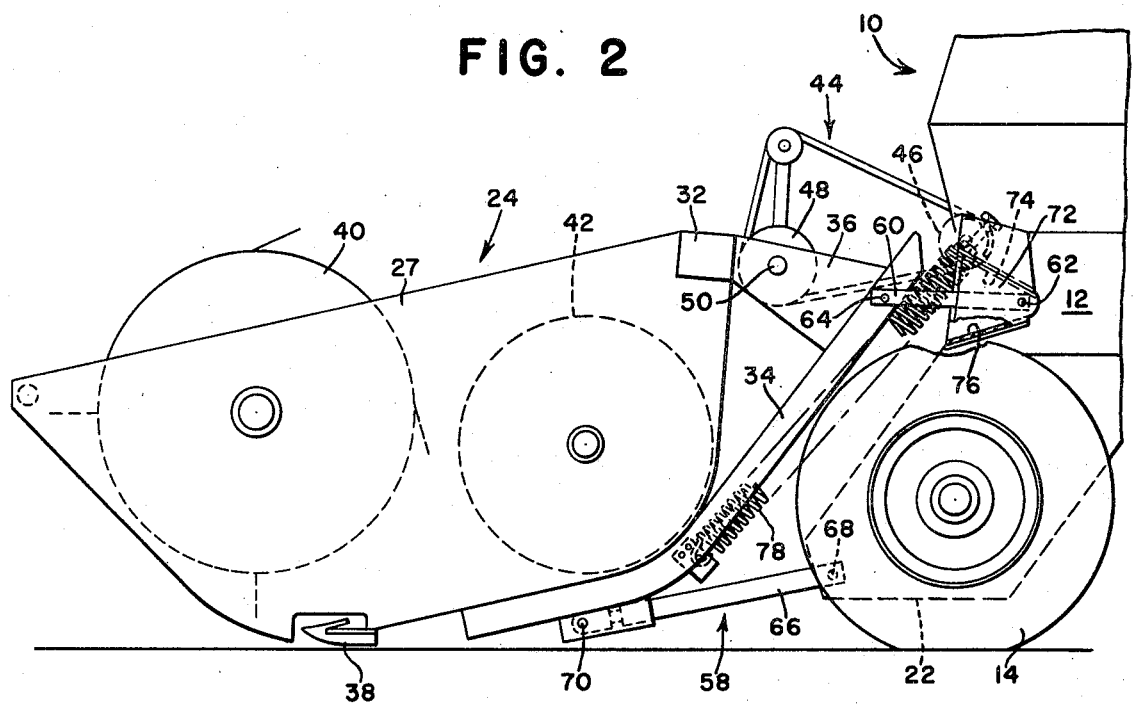
FIG. 2 is a side elevation view of the forward end of the windrower with the platform in its lowered operating position.

When the platform 24 is in its lower operating position, as shown in FIG. 2, wherein the shoes below the cutterbar 38 ride along the ground, the cylinders 66 are retracted. The spring 78 is adjusted so that all but approximately 200–300 pounds of the platform weight is counterbalanced, the above weight of the header supported on the ground allowing the platform to closely follow the contour of the ground without bouncing while getting good upward-floating characteristics should the platform strike an obstruction. The spring 78 in the preferred embodiment has a spring rate of approximately 120–130 pounds per inch. As previously described, the platform is free to float upwardly or downwardly via the four-bar or parallelogram-type linkage formed by the upper links 60 and the cylinder 66. There is sufficient play in the upper link pivots and the cylinder pivots to permit the platform to tilt about a fore-and-aft axis, as described in U.S. Pat. 3,474,607, also assigned to the assignee herein.

When the platform encounters a depression, it will float downwardly until the spring totally counterbalances the weight of the header. As previously described, the bottom wall 76 of the housing 72 functions as a stop to limit the downward movement of the upper link 60, which thereby limits the downward floating of the platform. This prevents over-extension of the springs 78 past their elastic limit and also prevents the suspension mechanism from going over-center at the pivot 64.

To raise the platform, the cylinders 66 are extended. When the cylinders extend, several things simultaneously occur which cause the springs 78 to raise the platform. As is apparent from FIG. 2, the cylinder 66 is inclined slightly downwardly and forwardly, so that it initially exerts a relatively small downward force on the platform as it extends. However, as it extends, it becomes more nearly horizontal, decreasing the downward component of the force acting on the platform, and after a predetermined amount of extension, the cylinder is inclined upwardly and forwardly so that it exerts a lifting force. The decreasing downward force and the subsequent lifting force on the platform is one of the factors which permits the springs to raise the platform. Also, as the cylinders extend, the platform initially pivots about the pivots 62 and 64, which causes a slight stretching of the spring 78 and a consequent increase of the lifting force exerted by the spring. Thirdly, as the platform pivots, the relationship of the center of gravity of the platform, which is approximately at the axis of the auger 42, changes relative to the spring, decreasing the moment arm between the spring force and the center of gravity to thereby decrease the load supported by the spring. The net result of the above is that as the cylinder 66 extends, the spring 78 causes the platform to raise.

Figure 3:
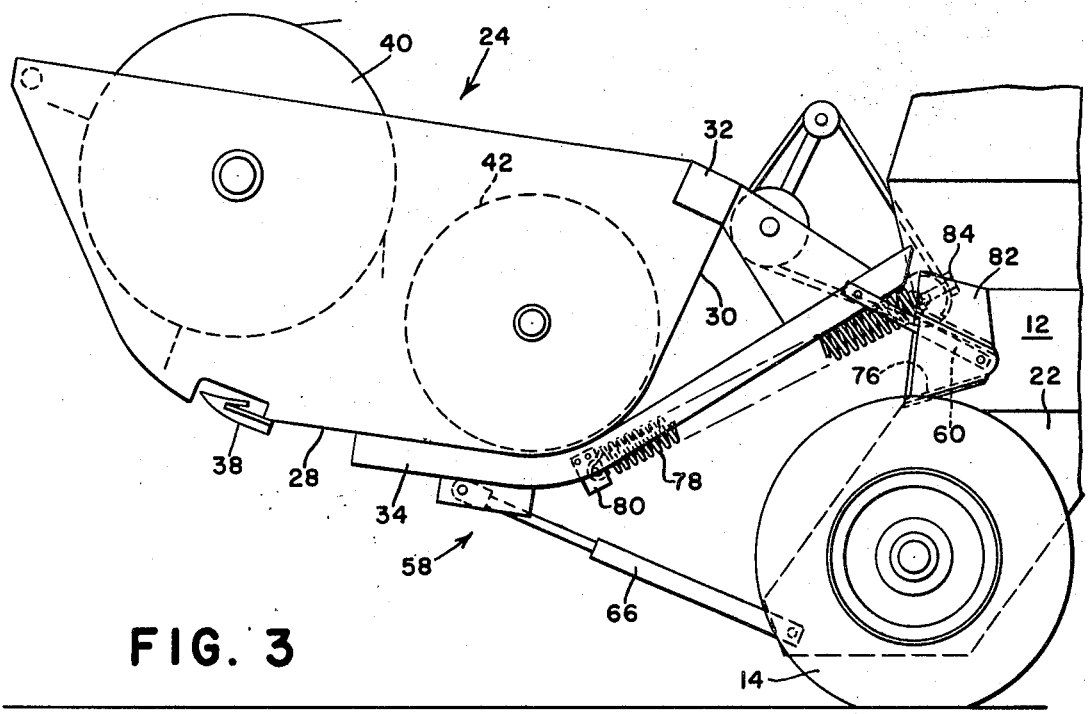
FIG. 3 is a view similar to FIG. 2, but with the platform in its raised transport position.

As the platform continues to raise, the upper links 60 swing upwardly until they engage the top walls 74 of the pivot housing 72, which act as stops to limit further upward swinging of the upper links. Thereafter, the platform swings only about the front pivots 64, so that the pivots 64 function as a hinge about which the platform rocks as the cylinders extend. This results in a rapid raising of the platform and further provides a relatively stable suspension when the platform is in its raised or transport position, as shown in FIG. 3.

As is apparent, although the geometry and the dynamics of the suspension mechanisms 56 and 58 are relatively complex, the components are relatively simple, providing a relatively inexpensive suspension system having the advantages of both the hinge-type platform mounting and the parallel-link platform suspensions.

We claim:

1. In a harvester having a mobile main frame and a forwardly disposed transversely elongated platform, the combination therewith of an improved means for mounting the platform on the main frame for vertical adjustment thereon and comprising: a pair of parallel, generally fore-and-aft, transversely spaced upper links having their rearward ends pivotally mounted on the main frame by first transverse pivot means and their forward ends pivotally connected to the platform by second transverse pivot means; a pair of parallel, generally fore-and-aft, transversely spaced hydraulic cylinders having their rearward ends pivotally mounted on the main frame by third transverse pivot means and their forward ends pivotally connected to the platform by fourth transverse pivot means, said cylinders cooperating with the upper links to provide parallel-linkage suspension mechanism allowing vertical adjustment of the platform relative to the main frame; and spring means operative between the platform and the main frame for partly counter-balancing the weight of the platform and exerting a lifting force on the platform as the cylinders extend to cause the platform to raise.

2. The invention defined in claim 1 and including a pair of lower stop means mounted on the main frame and respectively engageable with the upper links to limit the downward swinging of the upper links.

3. The invention defined in claim 2 and including a pair of upper stop means mounted on the main frame and respectively engageable with the upper links to limit the upper swinging of the upper links, whereby the platform rocks about the second pivot means as the cylinders extend after the upper links engage the upper stop means.

4. The invention defined in claim 1 wherein the upper links are respectively mounted in and extend forwardly from a pair of forwardly open housings mounted on the main frame and having forwardly diverging top and bottom walls engageable by the upper links to respectively limit the upward and downward swinging movement of the upper links.

5. The invention defined in claim 1 wherein the spring means includes a pair of downwardly and forwardly inclined helical tension springs having their forward ends respectively attached to the platform rearwardly of the fourth pivot means and their rearward ends respectively attached to the main frame adjacent to the upper links.

6. In a harvester having a mobile main frame and a forwardly disposed transverse elongated platform, the combination therewith of an improved means for mounting the platform on the main frame for vertical adjustment thereon and comprising: a pair of parallel, generally fore-and-aft, transversely spaced upper links having their rearward ends pivotally mounted on the main frame by first transverse pivot means and their forward ends pivotally connected to the platform by second transverse pivot means; a pair of parallel, generally fore-and-aft, transversely spaced hydraulic cylinders having their rearward ends pivotally mounted on the main frame by third transverse pivot means and their forward ends pivotally connected to the platform by fourth transverse pivot means, said cylinders cooperating with the upper links to provide parallel-linkage suspension mechanisms allowing vertical adjustment of the platform relative to the main frame; spring means operative between the platform and the main frame for partly counterbalancing the weight of the platform and exerting a lifting force on the platform as the cylinders extend to cause the platform to raise; and a pair of upper stop means mounted on the main frame and respectively engageable with the upper links to limit the upper swinging of the upper links, whereby the platform rocks about the second pivot means as the cylinders extend after the upper links engage the upper stop means.

7. The invention defined in claim 6 and including a pair of lower stop means mounted on the main frame and respectively engageable with the upper links to limit the downward swinging of the upper links.

8. The invention defined in claim 7 wherein the spring means includes a pair of downwardly and forwardly inclined helical tension springs having their forward ends respectively attached to the platform rearwardly of the fourth pivot means and their rearward ends respectively attached to the main frame adjacent to the upper links.

* * * * *